United States Patent
Adiga et al.

(10) Patent No.: US 9,513,909 B2
(45) Date of Patent: Dec. 6, 2016

(54) VARIABLE UPDATES OF BRANCH PREDICTION STATES

(71) Applicant: International Business Machines Corporation, Armonk, NY (US)

(72) Inventors: Narasimha R. Adiga, Bangalore (IN); James J. Bonanno, Wappingers Falls, NY (US); Ashutosh Misra, Lucknow (IN); Anthony Saporito, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/073,685

(22) Filed: Mar. 18, 2016

(65) Prior Publication Data

US 2016/0188339 A1    Jun. 30, 2016

Related U.S. Application Data

(63) Continuation of application No. 14/247,813, filed on Apr. 8, 2014.

(51) Int. Cl.
*G06F 9/30* (2006.01)
*G06F 9/38* (2006.01)

(52) U.S. Cl.
CPC ....... *G06F 9/30061* (2013.01); *G06F 9/30058* (2013.01); *G06F 9/30145* (2013.01); *G06F 9/3806* (2013.01); *G06F 9/3844* (2013.01); *G06F 9/3848* (2013.01)

(58) Field of Classification Search
CPC .. G06F 9/3806; G06F 9/3844; G06F 9/3005; G06F 9/30058; G06F 9/30061; G06F 9/30145; G06F 9/3842; G06F 9/3848
See application file for complete search history.

(56) References Cited

U.S. PATENT DOCUMENTS

| | | | |
|---|---|---|---|
| 8,078,852 B2 | 12/2011 | Al-Otoom et al. | |
| 9,122,486 B2 | 9/2015 | Venkumahanti et al. | |
| 2014/0019722 A1* | 1/2014 | Nagao | G06F 9/3804 712/207 |

OTHER PUBLICATIONS

List of IBM Patents or Patent Applictions Treated As Related; (Appendix P), Filed Jul. 18, 2016, 2 pages.
Narasimha R. Adiga, et al., Pending U.S. Appl. No. 14/247,813 entitled "Variable Updates of Branch Prediction States," filed with the U.S. Patent and Trademark Office on Apr. 8, 2014.

* cited by examiner

*Primary Examiner* — Benjamin Geib
(74) *Attorney, Agent, or Firm* — Cantor Colburn LLP; Margaret McNamara

(57) ABSTRACT

Embodiments relate to variable branch prediction. An aspect includes determining a branch selection of an execution unit of a processor and determining whether a present prediction state of the state machine correctly predicted the branch selection by the execution unit. The aspect includes determining whether a predetermined condition is met for performing an alternative state transition and, based on determining that the predetermined condition is met, changing the present prediction state of the branch prediction state machine from the one state to another state according to an alternative state transition process based on the branch selection of the execution unit and the determination whether the present prediction state of the state machine correctly predicted the branch selection by the execution unit.

1 Claim, 4 Drawing Sheets

VARIABLE UPDATES OF BRANCH PREDICTION STATES

DOMESTIC PRIORITY

This application is a continuation of U.S. patent application Ser. No. 14/247,813, filed Apr. 8, 2014, the content of which is incorporated by reference herein in its entirety.

BACKGROUND

The present invention relates generally to instruction processing, and more specifically, to variable updates of branch prediction states when processing branch instructions.

Branch prediction is a performance-critical component of a pipelined high-frequency microprocessor. It is used to predict the direction ("taken" vs. "not-taken") and the target address of each branch instruction. This is beneficial because it allows processing to continue along a branch's predicted path rather than having to wait for the outcome of the branch to be determined. A penalty is incurred only if a branch is mis-predicted.

A branch target buffer (BTB) is a structure that stores branch and target information. It is a cache of branch information and in many ways is analogous to instruction and data caches. Lee and Smith, "Branch Prediction Strategies and Branch Target Buffer Design," Computer, January 1984, describes branch target buffers, and this document is incorporated by reference herein in its entirety. U.S. Pat. No. 5,574,871, "Method and Apparatus for Implementing a Set-Associative Branch Target Buffer," filed Jan. 4, 1994, which patent is incorporated herein by reference, describes a BTB circuit in a computer processor that predicts branch instructions with a stream of computer instructions. The BTB circuit uses a BTB cache that stores branch information about previously executed branch instructions. The branch information stored in the BTB cache is addressed by the last byte of each branch instruction. When an instruction fetch unit in the computer processor fetches a block of instructions it sends the BTB circuit an instruction pointer. Based on the instruction pointer, the BTB circuit looks in the BTB cache to see if any of the instructions in the block being fetched is a branch instruction. When the BTB circuit finds an upcoming branch instruction in the BTB cache, the BTB circuit informs an instruction fetch unit about the upcoming branch instruction.

Other structures, such as a Branch History Table (BHT), a Pattern History Table (PHT), and a Multiple Target Table (MTT), can be included to store additional information used for branch direction and target prediction. For example, U.S. Pat. No. 7,082,520, "Branch Prediction Utilizing Both a Branch Target Buffer and a Multiple Target Table", filed May 9, 2002, which is incorporated herein by reference, describes an improved branch prediction process that utilizes both a BTB and a MTT for providing the capability to predict multiple targets for a single branch. A MTT when used in conjunction with a BTB allows for branches which have changing targets to be able to selectively choose the target of choice based on the execution path that was taken that lead to the given branch. The method predicts target addresses, and between the static and dynamic target address, and upon finding a hit, the target is sent to the instruction cache such that a fetch can begin for the current target address and the target address is sent back to the BTB to begin the search for the next branch given the current target predicted address. Upon resolving a branch the dynamic target is placed in MTT for future use.

A BHT or a PHT usually uses saturating counters as a state machine to predict the direction of branches. A BHT is indexed based on the instruction address of the branch itself. A PHT is indexed based on the path taken to get to the branch. Usually, each table entry is a two-bit saturating counter, but other sizes are also possible. The saturating counter attempts to learn the dominant behavior of a branch or multiple branches mapping to the same table entry, and the saturating counter predicts that direction.

Sometimes the branches that map to a BHT or PHT entry exhibit a pattern that is difficult to predict. For example, a pattern that alternates between "not taken" and "taken" may be difficult to predict and the accuracy of the prediction may vary based upon an initial state when the pattern begins.

SUMMARY

Embodiments include a method, system, and computer program product for predicting instruction branches. An aspect includes a processor, communicatively coupled to memory, the processor including an execution unit for executing instructions and a prediction unit for predicting a branch selection of the execution unit. The prediction unit has stored therein a state machine made up of a plurality of branch predictors for encoding a present prediction state. The state machine includes a plurality of "taken" states and a plurality of "not-taken" states. The computer system is configured to perform a method including determining, by the prediction unit of the processor, that a present state of the state machine is one of the plurality of "not-taken" states or one of the plurality of "taken" states. The method includes determining, by the prediction unit of the processor, the branch selection of the execution unit corresponding to a selection to take a branch of a branch instruction or to not take the branch of the branch instruction and determining whether the present prediction state of the state machine correctly predicted the branch selection by the execution unit. The method further includes determining, by the prediction unit of the processor, whether a predetermined condition is met for performing an alternative state transition. The method further includes, based on determining that the predetermined condition is not met changing, by the prediction unit of the processor, the present prediction state of the state machine from a first state to a second state according to a default state transition process based on the branch selection of the execution unit and the determination whether the present prediction state of the state machine correctly predicted the branch selection by the execution unit. The method further includes, based on determining that the predetermined condition is met, changing the present prediction state of the state machine from the first state to a third state according to an alternative state transition process based on the branch selection of the execution unit and the determination whether the present prediction state of the state machine correctly predicted the branch selection by the execution unit.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Branches that map to branch-predicting state machines may exhibit patterns that are difficult to predict, and the accuracy of the branch-predicting state machines may vary depending on an initial state when the patterns begin. Embodiments relate to performing variable updates of branch prediction states to vary state transitions in the branch-predicting state machine based on a branch selection.

Figure 1:
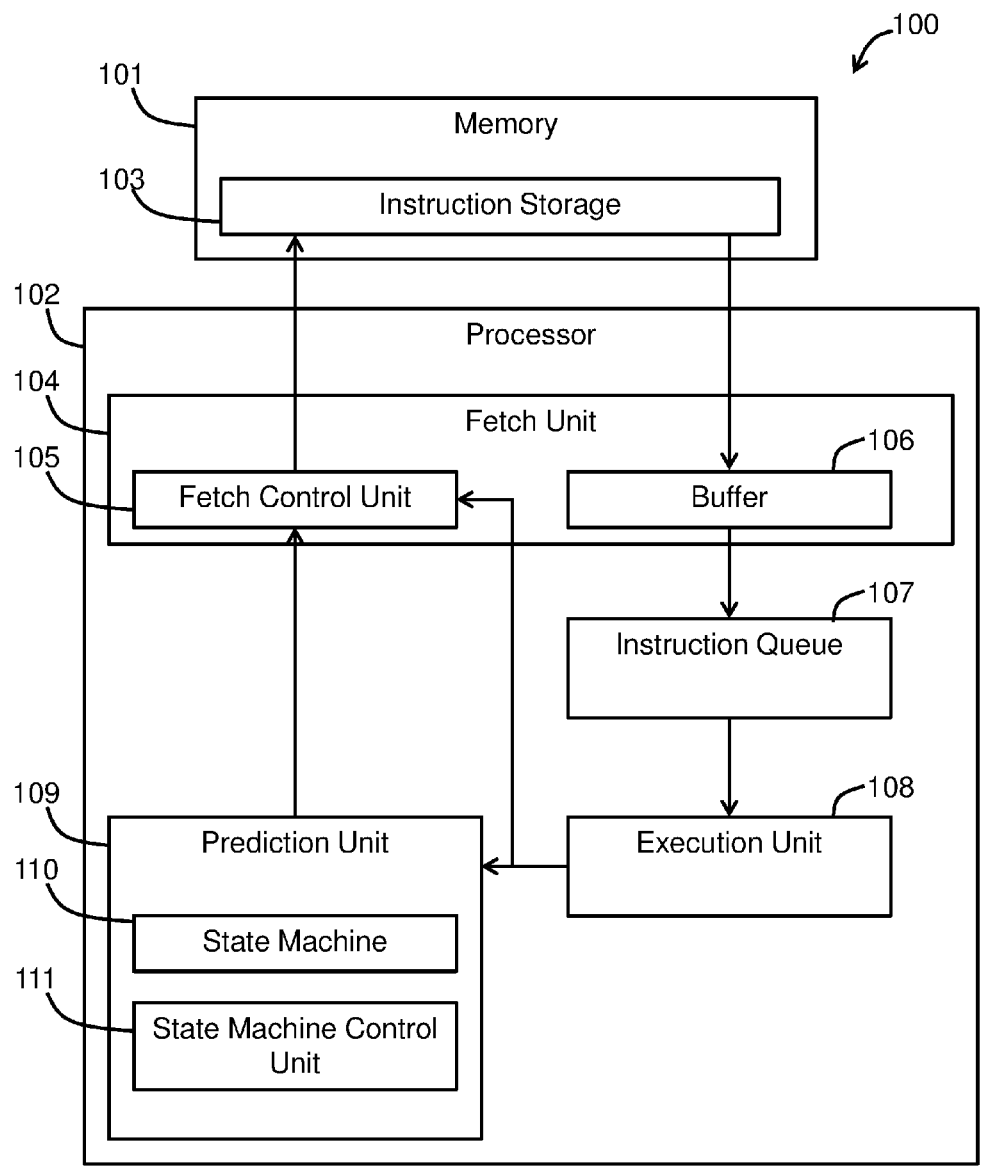
FIG. 1 depicts a block diagram of a computer system in accordance with an embodiment.

Turning now to FIG. 1, a computer system 100 is generally shown. The system 100 includes memory 101 and a processor 102 connected to the memory to receive instructions from instruction storage 103 in memory 101 and to execute the instructions. In particular, a fetch unit 104 fetches instructions from the instruction storage 103 and sends the instructions to an instruction queue 107 where they await execution by the execution unit 108.

In one embodiment, the fetch unit 104 includes a fetch control unit 105 and a buffer 106. The fetch control unit 105 controls which instructions are fetched from the instruction storage 103, and the buffer 106 stores the instructions prior to sending to the instructions to the instruction queue 107. In another embodiment, the fetch unit 104 includes no buffer 106, and instead the instructions are transmitted directly from the instruction storage 103 to the instruction queue 107.

Figure 2:
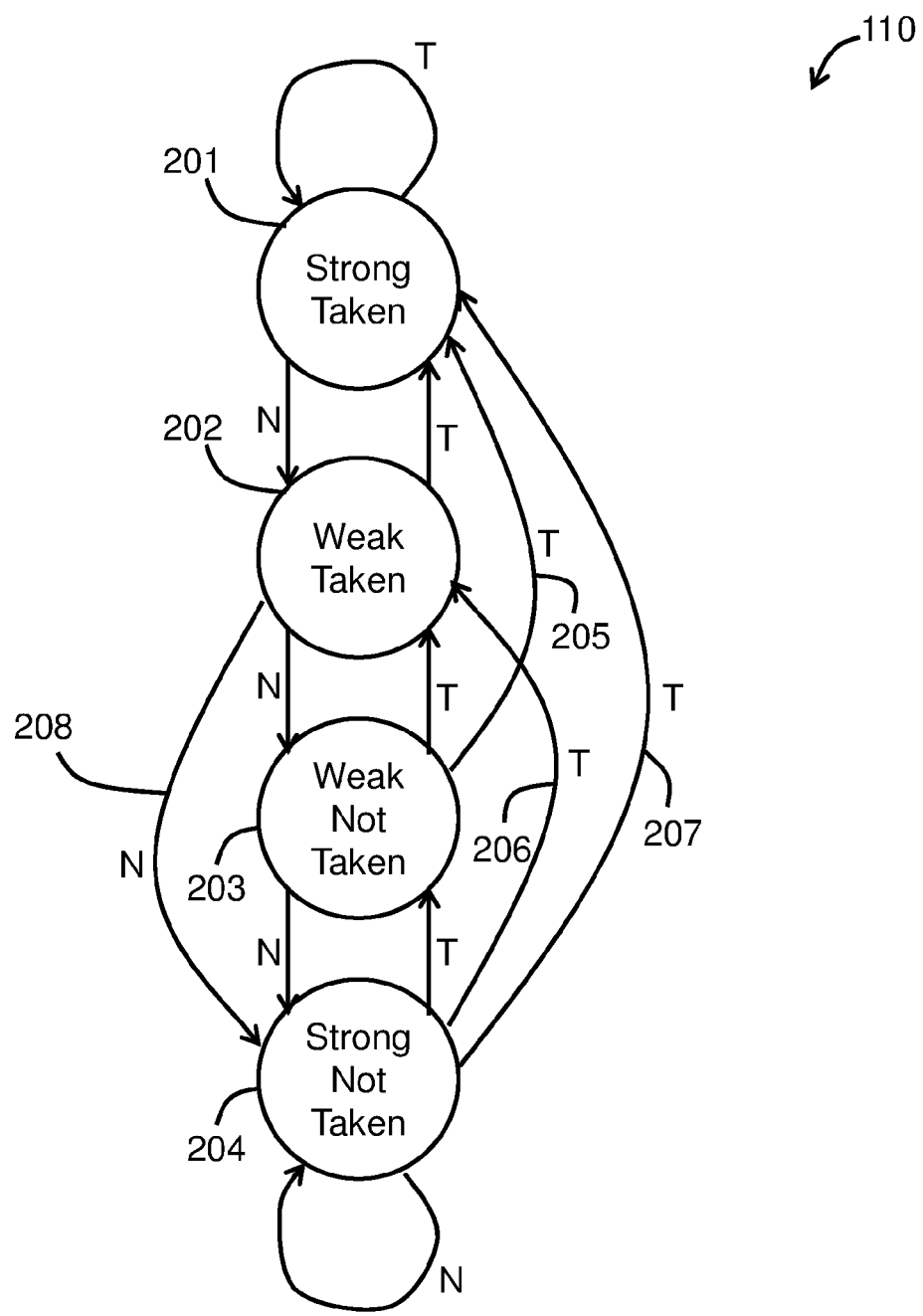
FIG. 2 depicts a state machine in accordance with an embodiment.

A prediction unit 109 receives data from the execution unit 108 regarding how instructions are executed, and in particular, whether a branch of a branch instruction is taken or not taken by the execution unit 108. The prediction unit 109 includes a state machine 110 and a state machine control unit 111 to control operation of the state machine 110. The state machine 110 may be made up of hardware and software that stores a current state and potential states. FIG. 2 is an example of a state machine 110 according to one embodiment.

FIG. 2 illustrates one embodiment of the state machine 110. As illustrated in FIG. 2, the state machine 110 includes a "strong taken" state 201, a "weak taken" state 202, a "weak not taken" state 203, and a "strong not taken" state 204. While four states are illustrated in FIG. 2, embodiments encompass any number of states. For example, in an alternative embodiment, the state machine may have two or more intermediate "taken" states and one end "taken" state, as well as two or more intermediate "not taken" states and one end "not taken" state. In embodiments, the states 201 to 204 all have branch prediction strength values. In particular, the "strong taken" branch prediction strength value is consecutive to the "weak taken" branch prediction strength value, and is non-consecutive to the "weak not-taken" and "strong not-taken" branch prediction strength values. Likewise, the "strong not-taken" branch prediction strength value is consecutive to the "weak not-taken" branch prediction strength value, and is non-consecutive to the "weak taken" and "strong taken" branch prediction strength values.

In operation, referring to FIGS. 1 and 2, the prediction unit 109 determines whether the execution unit 108 has taken or not taken a branch of a branch instruction. The prediction unit 109 also determines whether a predetermined condition is met which would trigger an alternative state transition. If the prediction unit 109 determines that the predetermined condition is not met, then the state machine control unit 111 controls the present prediction state of the state machine 110 to change from one state to another state in a default state transition process. In one embodiment, such as the embodiment illustrated in FIG. 2, the default state transition process is a transition from one state to an adjacent state, or a state having a consecutive prediction strength value. The direction of the state change is based on whether the branch was taken or not taken by the execution unit 108. On the other hand, if the prediction unit 109 determines that the predetermined condition is met, then the state machine control unit 111 controls the present prediction state of the state machine 110 to move from one state to another state in an alternative state transition process. In the embodiment illustrated in FIG. 2, the alternative state transition process is a change from one state to another state having a non-consecutive prediction strength value, or skipping a state.

In particular, in one embodiment if the present prediction state is the "taken" end state ("strong taken") 201, and the branch is not taken, then the prediction unit 109 determines that the prediction was incorrect. If the prediction unit 109 further determines that the predetermined condition is not met, then the state machine control unit 111 controls the state machine 110 to move the present prediction state to the "weak taken" state 202, or one consecutive state in the direction of the "not taken" end ("strong not taken") 204. If the present prediction state of the state machine is in the "taken" intermediate state ("weak taken") 202, and the branch is not taken and the predetermined condition not met, then the state machine control unit 111 controls the state machine 110 to move the present prediction state to the "weak not taken" state 203, or one consecutive state in the direction of the "not taken" end ("strong not taken") 204. If the state machine is in the "not taken" intermediate state ("weak not taken") 203, and the branch is not taken, then the state machine control unit 111 controls the state machine 110 to move the present prediction state to the "strong not taken" state 204, or one consecutive state in the direction of the "not taken" end ("strong not taken") 204.

Conversely, if the present state is the "not taken" end state ("strong not taken") 204, the branch is taken, and the predetermined condition is not met, then the state machine control unit 111 controls the state machine 110 to move the present prediction state to the "weak not taken" state 203, or one consecutive state in the direction of the "taken" end ("strong taken") 201. If the state machine is in the "not taken" intermediate state ("weak not taken") 203, the branch is taken, and the predetermined condition is not met, then the state machine control unit 111 controls the state machine 110 to move to the "weak taken" state 202, or one consecutive state in the direction of the "taken" end ("strong taken") 201. If the state machine is in the "taken" intermediate state ("weak taken") 202, the branch is taken, then the state machine control unit 111 controls the state machine 110 to move to the "strong taken" state 201, or one consecutive state in the direction of the "taken" end ("strong taken") 201.

In addition, if the present state is the "taken" end state ("strong taken") 201, and the branch is taken, then the state machine control unit 111 controls the state machine 110 to maintain the state at the "taken" end state ("strong taken") 201. Likewise, if the present state is the "not taken" end state ("strong not taken") 204, and the branch is not taken, then the state machine control unit 111 controls the state machine 110 to maintain the state at the "not taken" end state ("strong not taken") 204.

However, as discussed above, according to embodiments, if the prediction unit 109 determines that the predetermined condition is met, the state machine control unit 111 controls the state machine 110 to change the present prediction state in an alternative state transition process, such as by skipping at least one state. In other words, the state machine control unit 111 controls the state machine 110 to move to a non-consecutive state of the state machine 110. The predetermined condition may be any desired condition, including a predetermined number of incorrect predictions, or events in which the branch decision (taken or not taken) of the execution unit 108 does not agree with the state of the state machine. For example, if the state machine 110 is in a strong taken state 201 or a weak taken state 202 and the execution unit 108 does not take a branch of the branch instruction, then the prediction fails or is incorrect. In another embodiment, the predetermined condition is a random number of branch decisions of the execution unit 108, a random number of instruction execution cycles, or any other random period of time or number of functions performed by the processor 102. The random number may be a stored random number, a new number that is regenerated after each meeting of the condition, or any other stored or generated random number.

In one embodiment, the predetermined condition is dependent upon whether the prediction of the prediction unit is correct. In such an embodiment, the alternative state transition process may be implemented only when a last-made prediction is incorrect, for example, and would not be implemented when a last-made prediction is correct. In other embodiments, the predetermined condition is not dependent upon whether the prediction of the prediction unit is correct, such as when a random or predetermined number of branch instructions have been executed. In such an embodiment, the alternative state transition process may be implemented both when the last-made prediction is incorrect and when the last-made prediction is correct.

In one embodiment, when the predetermined condition is met, the state machine control unit 111 controls the state machine 110 to move to a non-consecutive state in a direction corresponding to a decision of the execution unit 108. For example, if the predetermined condition is a predetermined number of incorrect predictions, the present state is "weak not taken" 203, and the execution unit takes the branch of a branch instruction to meet the predetermined condition, the state machine control unit 111 may skip the "weak taken" state 202 and move the state instead to the "strong taken" state 201. This skip is represented by reference numeral 205. This skipping of one or more states may be particularly beneficial in breaking out of a bad pattern of alternating "taken" and "not-taken" branch outcomes where the "weak taken" state is predicting the branch occurrence with not taken outcome, and the "weak not taken" state is predicting the branch occurrence with the taken outcome. In a conventional system, a state machine would be 0% accurate predicting this pattern using a default state transitions. Upon applying alternative state transition 205 on when a prediction is "not taken" and the branch is actually taken, the state is updated to be in the "strong taken" state. If the pattern of alternating branch outcome continues, the state machine will continue to predict this branch taken alternating between the "strong taken" and "weak taken" states. Accuracy will improve to 50%.

In one embodiment, the state machine control unit 111 skips only one state. In another embodiment, the state machine control unit 111 skips a number of states greater than one. In yet another embodiment, the state machine control unit 111 skips all the states to set the next state as the end state. For example, in an embodiment in which the state machine control unit 111 skips only one state, the state may skip from a "strong not taken" state 204 to the "weak taken" state 202, as represented by reference numeral 206 in FIG. 2. Alternatively, in an embodiment in which the state machine control unit 111 skips all the intermediate states to set the next state as the end state, the state may skip from the "strong not taken" state 204 to the "strong taken" state 201, as illustrated by reference numeral 207 in FIG. 2.

While examples have been provided of skipping states in a direction of the "taken" end state 201, embodiments encompass skipping states in the direction of the "not taken" end state 204, as well. For example, if the present state is "weak taken" and the execution unit 108 does not take the branch of a branch instruction, thereby meeting a predetermined condition, the state machine control unit 111 controls the state machine 110 to skip from the "weak taken" state 202 to the "strong not taken" state 204, as represented by reference numeral 208 in FIG. 2.

In one embodiment, only one skip is performed each time the predetermined condition is met. In another embodiment, the skip is performed a predetermined number of times, such as ten times, twenty times, or fifty times based on the predetermined condition being met once. For example, if the predetermined condition is ten consecutive incorrect predictions, and a branch instruction is executed, thereby meeting the predetermined condition, the next fifty branch instructions may result in a skipping operation performed in the state machine 210. Then, a counter for the predetermined condition may be reset, and the prediction unit 109 may again begin determining whether the predetermined condition is met.

In one embodiment, the predetermined condition is applied globally to all branch instructions, such that the particular type of branch instruction is not taken into account when determining whether to perform the skipping operation. In such an embodiment, the prediction unit 109 may determine whether any branch prediction, regardless of an address of the branch instruction, or regardless of any other individualized identification of the branch instruction, is incorrect. The prediction unit 109 may then apply the skipping operation to the state machine to predict branch selection of any branch instruction, regardless of the address or type of branch instruction, or regardless of any other individualized identification of the branch instruction.

Alternatively, the prediction unit 109 may apply the skipping operation only to particular branch instructions that meet the predetermined condition. For example, the prediction unit 109 may include a table with addresses of different branch instructions in instruction storage 103, and in an embodiment in which the predetermined condition is a predetermined number of incorrect predictions, the prediction unit 109 may track how many times predictions associated with each address are incorrect. The prediction unit 109 may then perform the skipping operation only when predicting branches for the particular branch instructions that have met the predetermined threshold, and the prediction unit 109 may not perform the skipping operation for all other branch instructions.

In one embodiment, the prediction unit 109 applies the skipping operation only when an incorrect prediction corresponds to a "taken" selection of the execution unit 108, or in other words, only when the state machine 110 is in a "not taken" state. In another embodiment, the prediction unit 109 applies the skipping operation only when an incorrect prediction corresponds to a "not taken" selection of the execution unit 108. In yet another embodiment, the prediction unit 109 applies the skipping operation both when the incorrect prediction corresponds to a "taken" selection by the execution unit 108 and a "not taken" selection of the execution unit 108.

In one embodiment, the predetermined condition includes determining that the present state is an intermediate state, such as the "weak taken" state 202 and the "weak not taken" state 203 of FIG. 2, and the state-skipping operation is not performed if an incorrect prediction is made when the present state is an end state, such as the "strong taken" state 201 and the "strong not taken" state 204 of FIG. 2.

While an example embodiment is provided in FIG. 2 depicting a default state transition process being a transition from one state to an adjacent state, or a state having a consecutive prediction strength value, and an alternative state transition process being a transition from one state to a non-adjacent state, or a state having a non-consecutive prediction strength value, embodiments are not limited to this example. Instead, a default state transition process may be any transition from one state to another, and the alternative state transition process may be any transition from the one state to a different state, based on the same branch prediction determination (i.e. whether the branch prediction was correct or incorrect) but based on a different determination of whether a predetermined condition is met. In other words, the state machine is controlled to end up in different states based on the branch prediction result being the same (i.e. correct or incorrect) but the predetermined condition being different.

Figure 3:
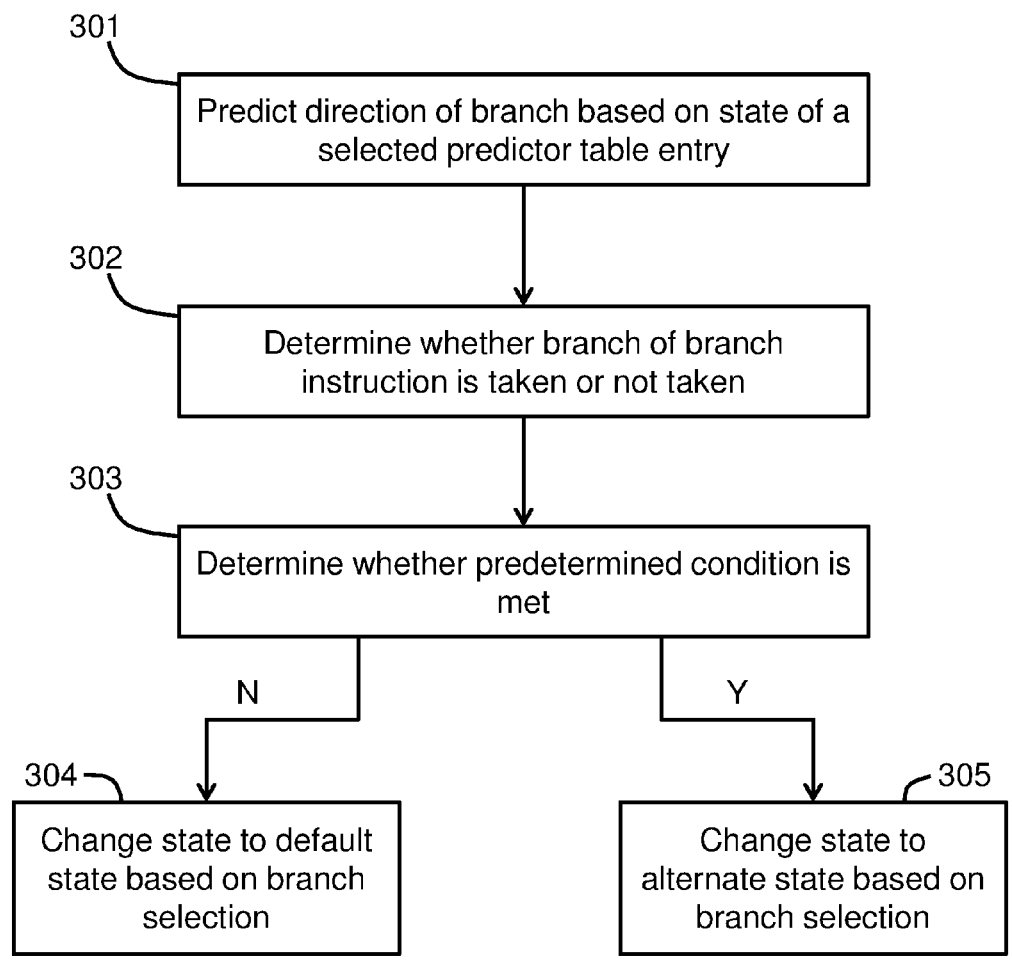
FIG. 3 depicts a process flow for branch instruction prediction in accordance with an embodiment.

FIG. 3 is a flow diagram of a method for predicting branches of branch instructions according to one embodiment. In block 301, a prediction unit of a processor predicts a direction of a branch, or whether an execution unit of the processor will take or not-take the branch, based on a present prediction state of a state machine.

In block 302, a branch decision of the execution unit of the processor is determined. In particular, a branch prediction unit of the processor may determine whether a branch is taken or not taken by the execution unit.

In block 303, it is determined whether a predetermined condition is met. The predetermined condition may be any condition, such as a predetermined number of incorrect predictions, or predictions in which the state of a prediction state machine is different than the branch decision of the execution unit. The predetermined condition may also be any other condition, such as a random or predetermined number of executed branch instructions, processor operations or cycles, or any other random or predetermined condition measurable by the processor.

If it is determined that the predetermined condition is not met, then the state machine is changed in block 304 according to a default state transition process from a present state to a next state. In particular, the present prediction state of the state machine is changed to a next state in a direction corresponding to the decision of the execution unit of the processor. For example, if the processor took the branch of the branch instruction, the state machine moves one consecutive or incremental state towards the "taken" end state if it is not already there, or stays in the "taken" end state if it is already there.

On the other hand, if it is determined that the predetermined condition is met, then the state machine is controlled in block 305 to change the present prediction state according to an alternative state transition process. In particular, a state-skipping operation is performed in which the state machine is changed from a present state to a non-consecutive state in the direction of the branch selection of the execution unit. For example, if the state machine was in a "not taken" state and the execution unit took the branch of the branch instruction, then the state machine is controlled to skip at least one state to a "taken" state in the direction of the "taken" end state. For example, in one embodiment, the state skips to the "taken" end state from a "not taken," skipping over the "taken" intermediate states that would normally be passed through if the predetermined condition were not met.

Although an example of a flow diagram is provided, embodiments are not limited to the illustrated example. For example, in an embodiment in which the predetermined condition is a random number of executed branch instructions, processor cycles, or other processor operations, block 302 of the flow diagram may be unnecessary, since the predetermined condition is not dependent on incorrect predictions. Accordingly, embodiments encompass any method in which a skip operation is performed in a state machine that predicts branch decisions of branch instructions that otherwise operates by changing from one consecutive state to another, where the skip operation is based on a predetermined condition being met.

In addition to one or more of the features described above, or as an alternative, the state machine may be a four-state state machine, and changing from the first state to the third state includes skipping from a "weak taken" state to a "strong not-taken" state when the branch selection is not taken, or from a "weak not-taken" state to a "strong taken" state when the branch selection is taken In addition to one or more of the features described above, or as an alternative, the predetermined condition may be a predetermined number of incorrect predictions, defined as the present prediction state of the state machine being in one of the "taken" and "not taken" states, and the execution unit performing an opposite one of not taking and taking the branch of the branch instruction.

In addition to one or more of the features described above, or as an alternative, the predetermined number of incorrect predictions may be a predetermined number of consecutive incorrect predictions regardless of a type of branch instruction executed.

In addition to one or more of the features described above, or as an alternative, incorrect branch predictions for one or more branch instructions may be tracked separately, the predetermined number of incorrect predictions may be a predetermined number of consecutive incorrect predictions of one branch instruction, and the alternative state transition process may be applied only to the one branch instruction.

In addition to one or more of the features described above, or as an alternative, the predetermined condition may be an execution of a random number of branch instructions.

In addition to one or more of the features described above, or as an alternative, the processor may further be configured to repeat the alternative state transition process a predetermined plurality of times based on a determination one time that the branch was incorrectly predicted and the predetermined condition is met.

In addition to one or more of the features described above, or as an alternative, the alternative state transition process may include skipping from the first state having a first prediction strength level to the third state having a non-consecutive prediction strength level with the first state, and the default state transition process may include changing from the first state having the first prediction strength level to the second state having a consecutive prediction strength level.

Technical effects and benefits include improved branch prediction in difficult-to-predict branch patterns.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 4:
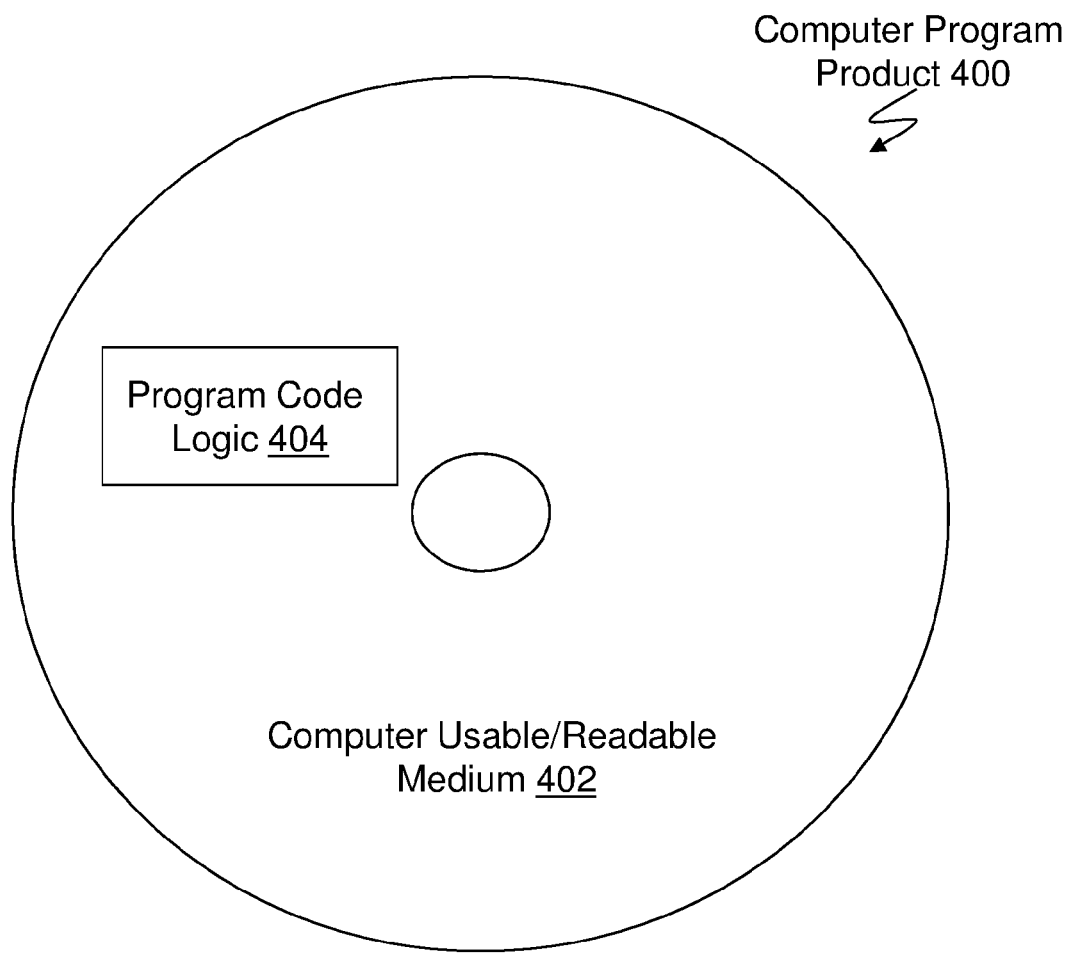
FIG. 4 depicts a computer-readable medium according to an embodiment.

Referring now to FIG. 4, a computer program product 400 in accordance with an embodiment that includes a computer readable storage medium 402 and program instructions 404 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system for variable updates of branch prediction states, the system comprising:
   a memory for storing instructions; and
   a processor, communicatively coupled to the memory, the processor including an execution unit for executing instructions and a prediction unit for predicting a branch selection of the execution unit, the prediction unit having stored therein a four-state state machine made up of a plurality of branch predictors for encoding a present prediction state, the state machine including a plurality of "taken" states and a plurality of "not-taken" states, the computer system configured to perform a method comprising:
     determining, by the prediction unit of the processor, that a present state of the state machine is one of the plurality of "not-taken" states or one of the plurality of "taken" states;
     determining, by the prediction unit of the processor, the branch selection of the execution unit corresponding to a selection to take a branch of a branch instruction or to not take the branch of the branch instruction;
     determining whether the present prediction state of the state machine correctly predicted the branch selection by the execution unit;
     determining, by the prediction unit of the processor, whether a predetermined condition is met for performing an alternative state transition, wherein the predetermined condition is a predetermined number of incorrect predictions;
     based on determining that the predetermined condition is not met, changing, by the prediction unit of the processor, the present prediction state of the state machine from a first state to a second state according to a default state transition process based on the branch selection of the execution unit and the determination whether the present prediction state of the state machine correctly predicted the branch selection by the execution unit, the second state having a consecutive prediction strength level with the first state;
     based on determining that the predetermined condition is met, changing the present prediction state of the state machine from the first state to a fourth state according to an alternative state transition process based on the branch selection of the execution unit and the determination whether the present prediction state of the state machine correctly predicted the branch selection by the execution unit, the fourth state having a non-consecutive prediction strength level with the first state, wherein changing from the first state to the fourth state includes skipping from a "strong taken" state to a "strong not-taken" state when the branch selection is not taken, or from a "strong not-taken" state to a "strong taken" state when the branch selection is taken; and
     repeating the alternative state transition process a predetermined plurality of times after one first time based on a determination that the alternative state transition process was performed the one first time.

* * * * *